E. BRUNTON.
MEASURING INSTRUMENT.
APPLICATION FILED MAR. 25, 1916.
1,221,668.
Patented Apr. 3, 1917.
2 SHEETS—SHEET 1.
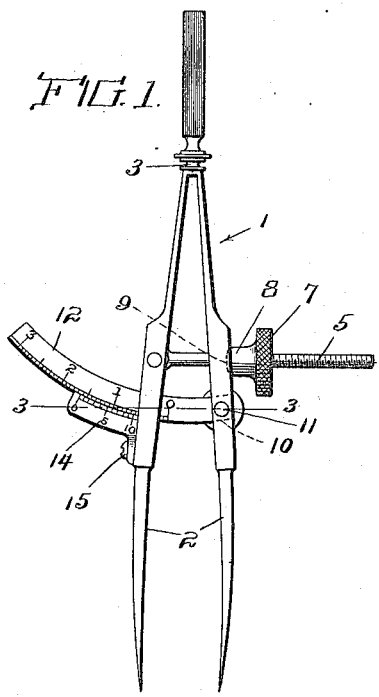
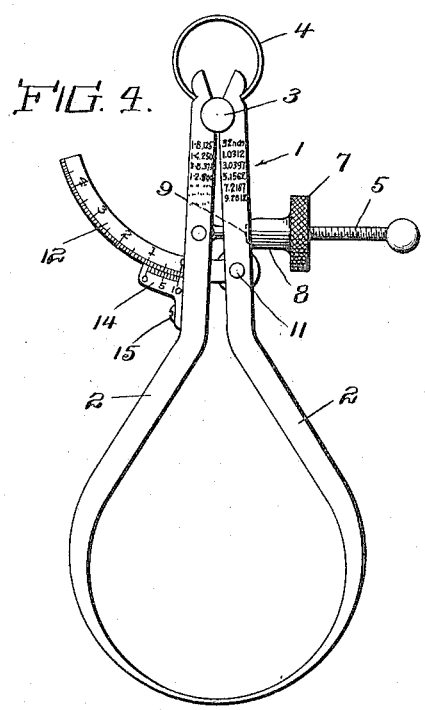
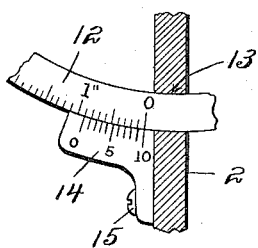
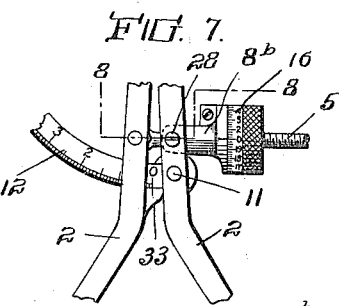
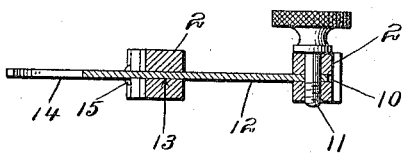
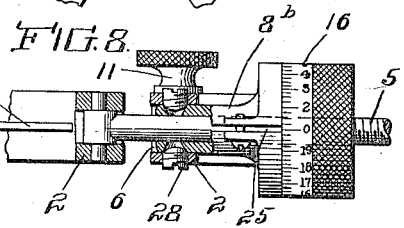
Inventor
Earl Brunton
Witnesses
By Victor J. Evans
Attorney

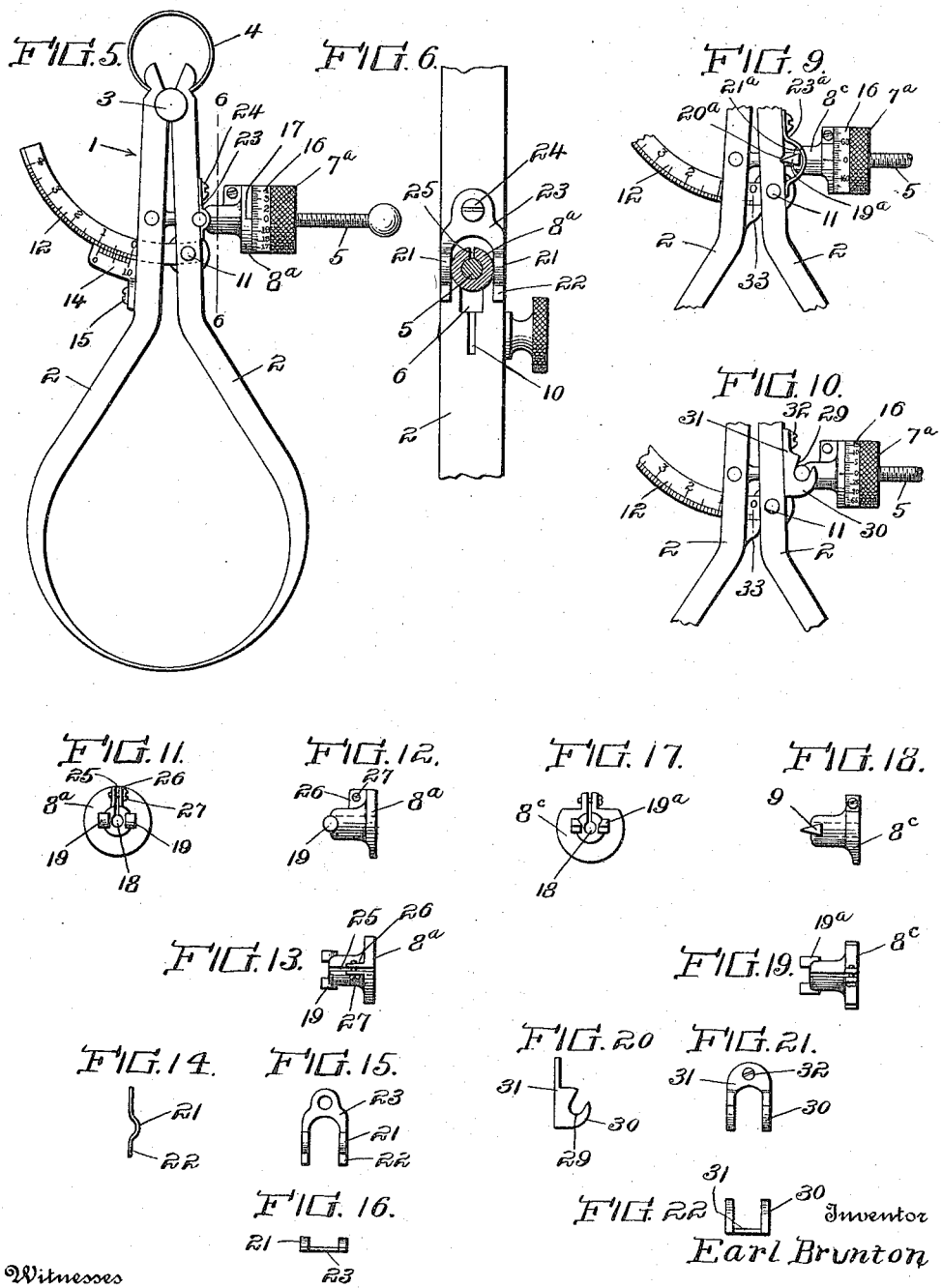
E. BRUNTON.
MEASURING INSTRUMENT.
APPLICATION FILED MAR. 25, 1916.
1,221,668.
Patented Apr. 3, 1917.
2 SHEETS—SHEET 2.

UNITED STATES PATENT OFFICE.

EARL BRUNTON, OF ST. LOUIS, MISSOURI.

MEASURING INSTRUMENT.

1,221,668. Specification of Letters Patent. Patented Apr. 3, 1917.

Application filed March 25, 1916. Serial No. 86,626.

*To all whom it may concern:*

Be it known that I, EARL BRUNTON, a citizen of the United States, residing at St. Louis, in the State of Missouri, have invented new and useful Improvements in Measuring Instruments, of which the following is a specification.

This invention relates to improvements in measuring instruments designed particularly for use in making drawings to scale in securing accurate measurements of objects.

The primary purpose of the invention is to provide, among other features, a measuring instrument in the form of dividers or calipers which embodies a scale member or bar and a coacting vernier, so as to permit of obtaining accurate measurements of objects and the accurate construction of drawings.

A further object of the invention is to provide a novel construction of measuring instrument of the character defined which embodies improved means, in the form of a micrometer screw and coöperating parts, for adjusting the legs of the instrument to very fine or accurate degrees, and which includes a follower and means for securing the same in position and also adjusting the same to compensate for wear and thus prevent looseness of the parts.

With these and other objects in view, the invention consists of the features of construction, combination and arrangement of parts hereinafter fully described and claimed, reference being had to the accompanying drawings in which:—

Figure 1 is an elevation of a pair of dividers embodying my invention.

Fig. 2 is a fragmentary enlarged vertical sectional view taken through the structure shown in Fig. 1, showing the mounting of the adjusting and scale members.

Fig. 3 is a horizontal sectional view taken on the line 3—3 of Fig. 1.

Fig. 4 is an elevation of a pair of calipers embodying one of the features of my invention.

Fig. 5 is a similar view of a pair of calipers showing the use of my improved adjusting means.

Fig. 6 is a sectional elevation on the line 6—6 of Fig. 5.

Fig. 7 is a fragmentary elevational view showing another mode of securing the follower in position.

Fig. 8 is a section on the line 8—8 of Fig. 7.

Fig. 9 is a view similar to Fig. 7 showing another mode of securing the follower in position.

Fig. 10 is a view similar to Figs. 7 and 9 showing still another mode of securing the follower in position.

Figs. 11, 12 and 13 are inner end, side and top views respectively of the form of follower shown in Figs. 5, 6 and 10.

Figs. 14, 15 and 16 are views of the follower retaining bracket shown in Figs. 5 and 6.

Figs. 17, 18 and 19 are views of the follower shown in Fig. 9.

Figs. 20, 21 and 22 are views of the follower retaining bracket shown in Fig. 10.

Referring to the drawings, 1 designates a measuring instrument which may be in the form of a pair of dividers, as shown in Figs. 1, 2 and 3, or a pair of calipers, as shown in Figs. 5 to 10, inclusive, the said measuring instrument consisting, more particularly of a pair of similar blades 2 terminating at their upper ends in a head 3, the legs 2, when constructed to form the dividers, being of a material and formation whereby the legs will be of a spring-like nature and tend to move apart with respect to the head 3 and to which the legs are common, whereas when the measuring instrument is formed to provide the calipers shown, a spring 4 is provided to normally hold the legs apart, said legs swinging upon the head 3 as a pivot. A screw 5 has its inner end suitably connected with one of the legs, said screw passing through an opening 6 in the other leg, with a nut 7 threaded upon the screw and provided with a projection or follower portion to bear upon the last-mentioned leg, so that by adjusting the nut the distance between the free ends of the legs can be varied, this being the usual construction in instruments of the class mentioned. Preferably, as shown, the end of the follower portion 8 is rounded or made of conoidal form to pivotally engage a socket or recess 9 within the leg against which it bears, by means of which the screw is adapted to easily and freely assume the different compensating angular positions as the legs are adjusted with relation to each other.

Each leg 2 is provided with a slot, and pivotally mounted at one end in the slot 10 of one of the legs, upon a pivot and clamping screw 11, is a scale member 12, which is preferably of partly circular or arcuate form. The opposite or free end of this scale member extends through and is slidably mounted within the slot 13 in the other leg, and this scale member is provided upon one or both sides with suitable scale graduations, whereby the distance between the free ends of the legs 2 will be indicated so that accurate measurements may be made without the use of a separate measuring instrument. The scale graduations upon the scale member may be in inches and fractions thereof, and scales of different degrees of fineness or fractional indications may be provided upon the opposite sides of said member, so that both coarse and fine measurements may be made with ease and facility. Secured to the outer side of the leg 2 and through the slot in which the free end of the scale member 12 passes is a second scale member 14 which is secured to the leg by a screw or other similar fastening 15, and this scale member 14 is provided with a vernier scale for coöperation with the scale or scales upon the member 12, whereby the measuring range and efficiency of the instrument is increased.

The structural features above described are embodied in both forms of measuring instruments herein shown, but in Figs. 5 to 10, inclusive, I have shown certain modifications, particularly applying to the adjusting means, and which are illustrated in connection with the caliper construction, but may also be used in connection with a divider construction. As shown, for example in Figs. 5 and 6, the adjusting nut 7ª upon the screw 5 is provided with a micrometer scale 16, and is mounted for rotation upon the screw independently of the follower 8ª which is provided with a mark or indication 17 designed to normally register with the zero point of said scale. It will, of course, be understood that with this construction the threads of the screw and nut may be formed to admit of micrometric adjustment, so that the scale and indicator may indicate extents of adjustment upon full or partial revolutions of the nut in obtaining predetermined fine adjustments. The follower is supported independently of the screw and nut, being provided with a passage 18 registering with the threaded opening in the nut and having at its forward end a pair of spaced circular lugs or ears 19 which pivotally engage recesses 20 formed in the adjacent leg 2 and are held in position by the partly circular portions 21 in the arms 22 of a retaining clamp or bracket 23 secured to the said leg by a screw or similar fastening 24, by means of which the follower is held in position and at the same time pivotally supported to assume different angular positions with the screw with relation to the legs, and as will be readily understood. The follower is split longitudinally at its upper side, as indicated at 25, and formed with spaced ears 26 receiving a connecting and adjusting screw 27. By means of this screw the follower may be contracted or expanded to perfectly fit the adjusting screw 5 and the retaining arms of the retaining bracket, and may be afterward adjusted from time to time, as wear occurs, to adapt it to maintain a tight fit and thus prevent wabbling of the parts.

In the construction shown in Figs. 7 and 8 the lugs or ears 19 are dispensed with, the follower 8ᵇ having its end portion inserted within the opening of the adjacent leg and pivotally mounted upon a screw 28, but in Figs. 9 and 10 followers provided with lugs of modified form are shown and illustrate some of many modifications which may be resorted to in pivotally mounting and securing the follower in position. As shown in Fig. 9, the follower 8ᶜ is of the split construction before described but is provided with V-shaped lugs or ears 19ª engaging similarly shaped sockets or recesses 20ª formed in the adjacent leg 2, a bracket 23ª, of a construction similar to that before described, but having larger bends or offsets 21ª, being employed for engagement with the lugs to secure and pivotally mount the follower in place. In the construction shown in Fig. 10 the follower is of the same form as that disclosed in Figs. 5 and 6, but the lugs thereof are seated in receiving slots or recesses 29 in the fork plates or sides 30 of a bifurcated bracket 31 secured to the adjacent leg 2 by a screw or other similar fastening 32, by which construction the follower is held in place and pivotally mounted but is also adapted for easy detachment, as will be readily understood.

It will be evident from the foregoing description that the invention provides dividers, calipers or similar instruments which embody means for adjusting the legs thereof in an easy, convenient and simple manner, and for effecting such adjustments to a finely indicated degree, and also for obtaining an accurate reading of the distance between the points of the legs without the necessity of employing a separate measuring instrument, the advantages and conveniences of which will be manifest. If desired, the lug or projection 33 may be provided, upon the inner side of one of the legs and bear an indicating mark for coöperation with the zero point of the scale on the scale member 12, by means of which accurate indications may be obtained without the necessity of bringing the caliper legs so closely together for a primary or starting indication.

I claim:

1. In a measuring instrument including a pair of associated legs movable toward and from each other, said legs being provided with slots, leg adjusting means, means coöperating with the adjusting means for indicating degrees of adjustment thereof, a scale member pivotally mounted within the slot of one leg and adjustable through the slot in the other leg, and a second scale member fixedly mounted upon the second-named leg and arranged for sliding engagement with said movable scale member.

2. In a measuring instrument including a pair of associated legs movable toward and from each other, leg adjusting means, means coöperating with the adjusting means for indicating degrees of adjustment thereof, a scale carried by one of the legs and coöperating with the other leg to denote the distance between the legs, and a second scale carried by one of the legs and coöperating with the first-named scale to indicate different degrees of adjustment.

3. In a measuring instrument including a pair of associated legs movable toward and from each other, said legs being provided with slots, leg adjusting means, a scale member pivotally mounted within the slot of one leg and adjustable through the slot in the other leg, and a second scale member fixedly mounted upon the second-named leg and arranged for sliding engagement with said movable scale member.

4. In a measuring instrument including a pair of associated legs movable toward and from each other, leg adjusting means, means coöperating with said adjusting means for indicating degrees of adjustment thereof, a scale carried by one of the legs and coöperating with the other leg to denote the distance between the legs, an indicating member upon the inner surface of the second-named leg for coöperation with the graduations of said scale.

5. In a measuring instrument including a pair of associated legs movable toward and from each other, an adjusting screw pivotally connected with one of the legs and slidable through the other leg, a nut upon said screw, and a follower coöperating with said nut, said follower being pivotally connected with the adjacent leg of the instrument and provided with a longitudinal slot or bifurcation, and means for relatively adjusting the walls of the bifurcation.

6. In a measuring instrument including a pair of associated legs movable toward and from each other, leg adjusting means, means coöperating with the adjusting means for indicating the degrees of adjustment thereof, a scale carried by one of the legs and coöperating with the other leg to denote the distance between the legs, and an indicator carried by one of the legs and coöperating with the first-named scale to indicate different degrees of adjustment.

In testimony whereof I affix my signature in presence of two witnesses.

EARL BRUNTON.

Witnesses:
H. M. HERGET,
CARL W. WILLI.

Copies of this patent may be obtained for five cents each, by addressing the "Commissioner of Patents, Washington, D. C."